US011351811B2

(12) United States Patent
Rizzolo et al.

(10) Patent No.: US 11,351,811 B2
(45) Date of Patent: Jun. 7, 2022

(54) OPTICALLY-PASSIVE MAGNETIC SIGNATURE AND IDENTIFICATION FEATURE WITH ELECTROMAGNETIC TAMPER DETECTION

(71) Applicant: International Business Machines Corporation, Armonk, NY (US)

(72) Inventors: Michael Rizzolo, Delmar, NY (US); Marc A. Bergendahl, Troy, NY (US); Christopher J. Waskiewicz, Rexford, NY (US); Christopher J. Penny, Saratoga Springs, NY (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 16/888,126

(22) Filed: May 29, 2020

(65) Prior Publication Data

US 2021/0370705 A1 Dec. 2, 2021

(51) Int. Cl.
*G06K 19/06* (2006.01)
*B42D 25/369* (2014.01)
(Continued)

(52) U.S. Cl.
CPC .......... *B42D 25/369* (2014.10); *B42D 25/333* (2014.10); *B42D 25/373* (2014.10);
(Continued)

(58) Field of Classification Search
CPC ......... C08L 77/06; C08L 77/02; G06K 19/06; G06K 19/18; G06Q 20/3223
(Continued)

(56) References Cited

U.S. PATENT DOCUMENTS 6,503,603 B1 * 1/2003 Kaule .................. B42D 25/29
428/199
6,609,728 B1 8/2003 Voerman et al.
(Continued)

FOREIGN PATENT DOCUMENTS

CN    106029395    * 10/2016    .......... B42D 25/378
WO    2008039765       4/2008
WO    2016120382   *  8/2016    .............. G07C 9/00

OTHER PUBLICATIONS

Kehlberger, Andreas, et al., "Enhanced Magneto-optic Kerr Effect and Magnetic Properties of CeY2Fe5O12 Epitaxial Thin Films", American Physical Society, Physical Review Applied v. 4, n. 014008 (2015).

(Continued)

*Primary Examiner* — Daniel St. Cyr
(74) *Attorney, Agent, or Firm* — Stephen J. Walder, Jr.; Jeffrey S. LaBaw

(57) ABSTRACT

An article is authenticated by providing a magnetic security mark in the form of an optically-passive randomly-generated nanoscale magnetic pattern. The pattern is pre-imaged and this reference image is uploaded to a secure database along with an identifier for the article such as a serial number. A user of the article verifies its authenticity by scanning it magnetically to obtain a scanned image of the magnetic pattern. The serial number is used to retrieve the previously uploaded reference image which is compared to the scanned image. If the images match, the article's authenticity is confirmed. A single article may have multiple magnetic security marks, each unique, placed at predetermined, non-uniform locations. The magnetic patterns are generated using thin film deposition of yttrium iron garnet. In one (Continued)

embodiment the article is a physical key having additional security features, such as mechanical features and a radio-frequency identification chip.

19 Claims, 5 Drawing Sheets

(51) Int. Cl.
    *G06K 19/18*     (2006.01)
    *G06K 19/12*     (2006.01)
    *B42D 25/373*     (2014.01)
    *G06F 21/44*     (2013.01)
    *B42D 25/333*     (2014.01)
    *G06F 21/12*     (2013.01)

(52) U.S. Cl.
    CPC ............ *G06F 21/123* (2013.01); *G06F 21/44* (2013.01); *G06K 19/12* (2013.01); *G06K 19/18* (2013.01)

(58) Field of Classification Search
    USPC ........................................................ 235/493
    See application file for complete search history.

(56) References Cited

U.S. PATENT DOCUMENTS

| | | | |
|---|---|---|---|
| 7,605,081 B2 | 10/2009 | Yang et al. | |
| 10,150,323 B2 | 12/2018 | Briggs et al. | |
| 10,312,200 B2 | 6/2019 | Lai et al. | |
| 2003/0009683 A1 | 1/2003 | Schwenck et al. | |
| 2004/0207396 A1* | 10/2004 | Xiao | G01Q 10/04 324/244 |
| 2009/0008925 A1 | 1/2009 | Blondiaux et al. | |
| 2011/0043331 A1* | 2/2011 | Pradeep | G07D 7/005 340/5.86 |
| 2011/0215561 A1* | 9/2011 | Rosset | B42D 25/364 283/70 |
| 2012/0018509 A1 | 1/2012 | Martinez Abietar et al. | |
| 2012/0328852 A1* | 12/2012 | Tiller | B42D 25/25 428/195.1 |
| 2019/0193452 A1 | 6/2019 | Briggs et al. | |
| 2019/0311472 A1* | 10/2019 | Harrup | G06F 16/955 |

OTHER PUBLICATIONS

National Institute of Standards and Technology, "Directed Self-Assembly of Block Copolymers" [online], U.S. Department of Commerce, retrieved on May 27, 2020 from the Internet URL: http://www.nist.gov/cnst/nrg/nanomanufacturing_dsa.cfm (2018).

Pashkevich, Mikhail, "Ultrafast light-induced magnetization dynamics in Co/garnet heterostructures" [thesis], University of Bialystok, Faculty of Physics, Chapter 5, pp. 63-79, retrieved on May 1, 2020 from the Internet URL: https://www.researchgate.net/publication/311653013_Ultrafast_light-induced_magnetization_dynamics_in_Cogarnet_heterostructures (2015).

* cited by examiner

OPTICALLY-PASSIVE MAGNETIC SIGNATURE AND IDENTIFICATION FEATURE WITH ELECTROMAGNETIC TAMPER DETECTION

BACKGROUND OF THE INVENTION

Field of the Invention

The present invention generally relates to physical security of objects, and more particularly to a method of verifying the authenticity of an article.

Description of the Related Art

Devices for maintaining physical security of objects have evolved tremendously over the years. Oldest among these are basic lock-and-key fastening devices. The earliest locks had simple mechanical features that move in response to insertion of a matching key. A typical key is a small piece of metal consisting of two parts: the bit or blade, which slides into the keyway of the lock and distinguishes between different key types, and the bow or handle, which is left protruding so that torque can be applied by the user. Many common locks in use today still rely on the traditional tumbler-type design, where a series of spring-loaded tumblers slide within chambers, and the tumblers are moved by teeth or notches formed along an edge of the key. When the teeth are of proper size and position, each tumbler moves to a break line which then enables rotation of the lock cylinder, i.e., opening the lock. In its simplest implementation, a key operates one lock or a set of locks that are all keyed alike, but there are numerous other configurations such as locks used with conventional safe-deposit boxes which require both a master key and a client key. The key thus serves as a physical security token for access to the locked item or area; only persons having the correct key can open the lock and gain access.

Modern security devices can rely on other authentication means besides mechanical parts, or in addition thereto. For example, electronic locks have become commonplace. Electronic locks still have a mechanism that moves to create the physical locking engagement, but that mechanism is governed by an electronic circuit, e.g., having a solenoid or other electronic component whose state can be electronically controlled. The electronic circuit can be accessed using either a physical token or by supplying secret information, i.e., a password or personal identification number (PIN), via an input pad or keyboard. The physical token (an electronic key) has the authentication information embedded therein and the lock has an electronic or magnetic reader that can sense the authentication information. If the key information matches one or more preprogrammed values then the circuit opens the lock. The local circuit can have a memory unit that maintains the authentication information, or the electronic lock can be wired to a broader network for situations where an entity is overseeing many locks (e.g., a hotel) and the network can have a centralized server or other computing system that manages the authentication processes. An electronic key can be passive or active. A passive key has no power supply and the secret information is stored in a dormant state which can be decoded by the external reader, e.g., a plastic card having a magnetic strip formed thereon (keycard). An active key has a power supply and can generate the authentication information in response to an interrogation signal or user activation, e.g., a radio-frequency identification (RFID) circuit. More advanced electronic locks can employ rolling codes (where the authentication information changes) and cryptographic keys.

SUMMARY OF THE INVENTION

The present invention in at least one embodiment is generally directed to a method of authenticating an article by providing a magnetic security mark in the form of an optically-passive randomly-generated nanoscale magnetic pattern applied to the article. The pattern is pre-imaged, e.g., by a manufacturer, and this reference magnetic domain image is uploaded to a secure database in the cloud along with an identifier for the article such as a serial number. A user of the article can verify its authenticity by scanning it magnetically to obtain a scanned image of the magnetic pattern. The scanned image is then sent to a cloud server along with the serial number. The cloud server uses the serial number to retrieve the previously uploaded reference image and compares it to the scanned image. If the magnetic domain images match, the article's authenticity is confirmed. A single article can have multiple magnetic security marks, each unique, preferably placed at predetermined, non-uniform locations along the article. The magnetic patterns can be generated using thin film deposition of yttrium iron garnet. In one embodiment the article is a physical key having additional security features, such as mechanical features which interact with corresponding features of a lock, and a radio-frequency identification chip.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Since the first locks and keys were made, there have been ways to outsmart them. Even today the simpler locks that protect most homes and businesses can easily be picked. The same is becoming true of electronic locks. Current generation physical keys with embedded electronic components can now be defeated through duplication or manipulation/hacking by software. The next generation of keys such as laser etched keys, RFID-enabled keys and magnetic keys have seen a large increase in popularity. However, these keys have information that is embedded on the scale of a micron and are still susceptible to software tampering.

It would, therefore, be desirable to devise an improved security feature that can enable specialized identification methods to provide more robust authentication. It would be advantageous if the improved security feature could be relatively inexpensive to deploy but still possess sufficient complexity to make tampering infeasible. It would be further advantageous if the security feature could also allow detection of damage to an article that might not otherwise be noticeable. These and other advantages are achieved in various implementations of the present invention by utilizing a low-cost, stochastic magnetic-domain nanoscale process which surpasses the current physical-electrical hybrid key solutions. Magnetic features not visible to the human eye are fabricated with a variable degree of randomness that ensures high security and prevents duplication. The magnetic features constitute magnetic domain images which are uniquely associated with the particular article requiring authentication, e.g., a physical key or a product being transported.

Figure 1:
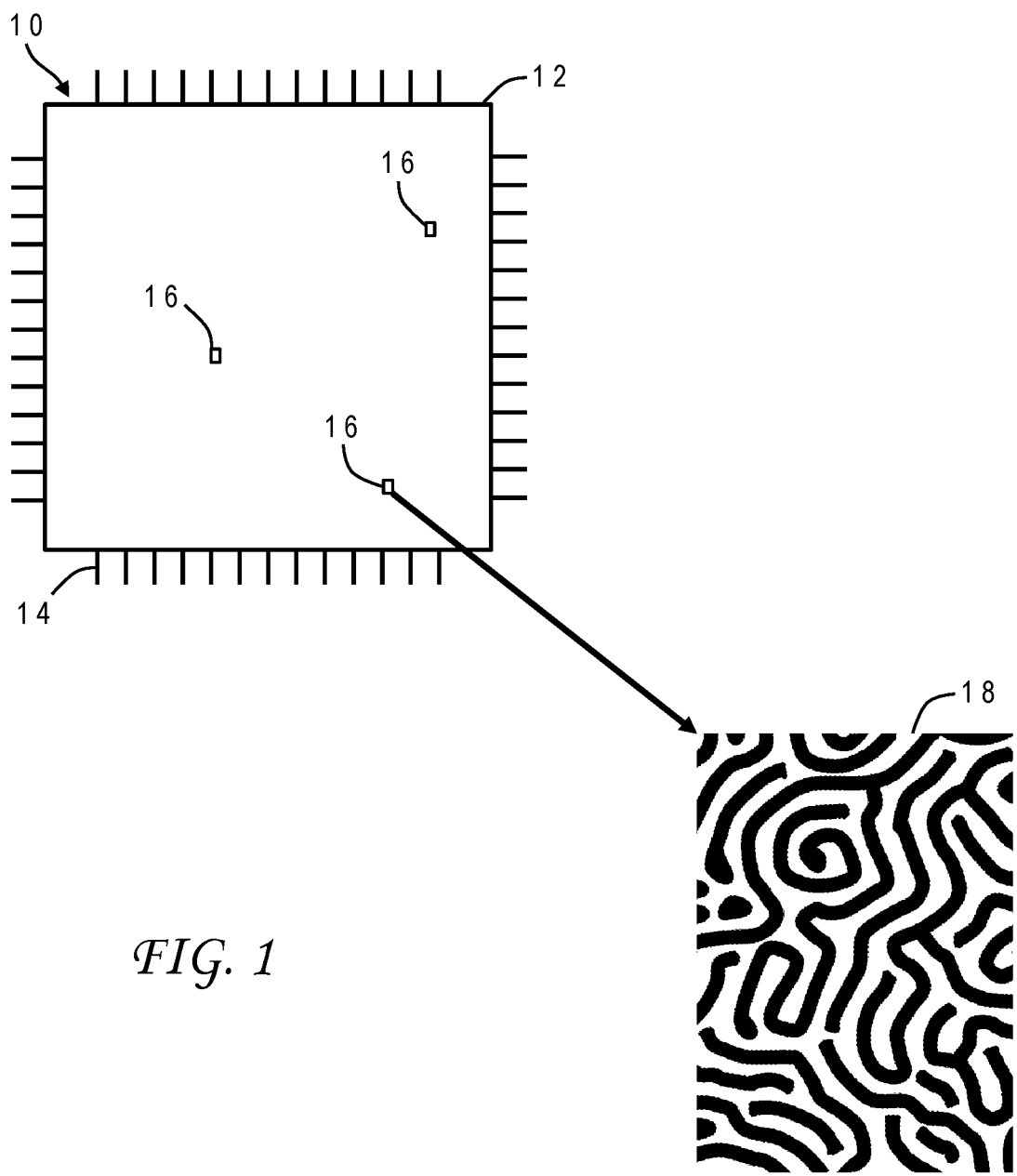
FIG. 1 is a plan view of an exemplary article (an integrated circuit chip) having an optically-passive magnetic signature and identification feature providing electromagnetic tamper detection in accordance with one implementation of the present invention.

With reference now to the figures, and in particular with reference to FIG. 1, there is depicted one embodiment 10 of an article or product which is to be delivered, e.g., from a manufacturer to a store or customer. For this embodiment, product 10 is an integrated circuit chip having a substrate 12 and a plurality of pins 14 providing external electrical connections. Integrated circuit chip 10 has a plurality of magnetic security marks 16 embedded therein, shown as small rectangles. However, magnetic security marks 16 are nanoscale and not visible to the naked eye, so are shown for purposes of illustration as much larger than they are in the actual product. As used herein nanoscale refers to structures or features with a length scale applicable to nanotechnology (nanoscopic), between microscopic size and molecular size. Although magnetic security marks 16 could be larger, they are preferably made of optically-passive material as explained further below and so still would not be visible even to optical sensors.

Magnetic security marks 16 may be formed on the surface of substrate 16 but they are preferably embedded under a protective outer layer so they are not easily or accidentally removed or damaged by slight abrasion. Magnetic security marks 16 are preferably placed at non-uniform locations along substrate 12, that is, not in any recognizable geometric pattern, e.g., non-collinear. They are also preferably placed at predetermined locations on substrate 12 to create a known template for authentication purposes. In the exemplary embodiment, each magnetic security mark is a randomly-generated magnetic pattern 18 defining a magnetic domain image (graphic or analog). The dark lines seen in pattern 18 thus have a magnetization (north or south), and the blank spaces between the lines have no magnetization. The lines in different patterns can have different thicknesses. As discussed further below, pattern 18 is generated by a stochastic process so the exact design of a given pattern is not predictable. In this manner, pattern 18 becomes a unique label or visual identifier for this specific product. To further enhance authentication, each magnetic security mark 16 on a single product 10 can have a different (unique) pattern.

In this manner, the particular combinations of patterns for this specific product can be recorded along with the predetermined locations on substrate 12 to create a distinctive identification image, and effectively prevent counterfeiting of the product. Product 10 can be separately labeled with an identifier such as a serial number which is stored in association with the magnetic pattern(s) by the manufacturer or other product source, so the purchaser or user of product 10 can verify its authenticity by scanning the product with an appropriate magnetic reader and seeing if the scanned magnetic patterns match the information kept by the manufacturer for this serial number. If the magnetic security marks match then the identity or safe transfer of the product is verified. If the magnetic security marks do not match then the recipient is informed that the product is either counterfeit or has been damaged, for example, due to a high-strength magnetic field, large electric current, or high temperature (all of which can disturb magnetic domains), or due to tampering. The present invention is accordingly suited for high-value products such as computer components or currency but, as will become apparent, this example should not be considered limiting as the present invention may be applied to any type of product. The invention can also be applied to a key or other physical security token as explained further below.

The magnetic pattern can be formed from any magnetic material, but preferably is created using materials which, as applied, are optically-passive. In other words, magnetic pattern 18 can only be read (sensed) by a magnetic reader and cannot be viewed or discerned through any traditional optical imaging techniques. Alternatively, pattern 18 can be covered with a blanket film that prevents optical detection, i.e., is optically opaque but magnetically transparent. In the illustrative implementation, magnetic pattern 18 is formed of yttrium iron garnet ($Y_3Fe_5O_{12}$, or YIG) or similar material. The magnetic pattern can also be created by any conventional means; see, e.g., the paper by Andreas Kehlberger et al. "Enhanced Magneto-optic Kerr Effect and Magnetic Properties of $CeY_2Fe_5O_{12}$ Epitaxial Thin Films" from Physical Review Applied vol. 4, no. 1 (2015). A random magnetic pattern naturally occurs due to how these thin 2D films are deposited. The film is cropped into a rectangular boundary to define the magnetic pattern. In this example YIG thin films are grown by pulsed laser deposition on gadolinium gallium garnet substrates. There are other ways to create a film with the magnetic pattern (different deposition conditions, epitaxial growth, substrates, materials, etc.).

Figure 2:
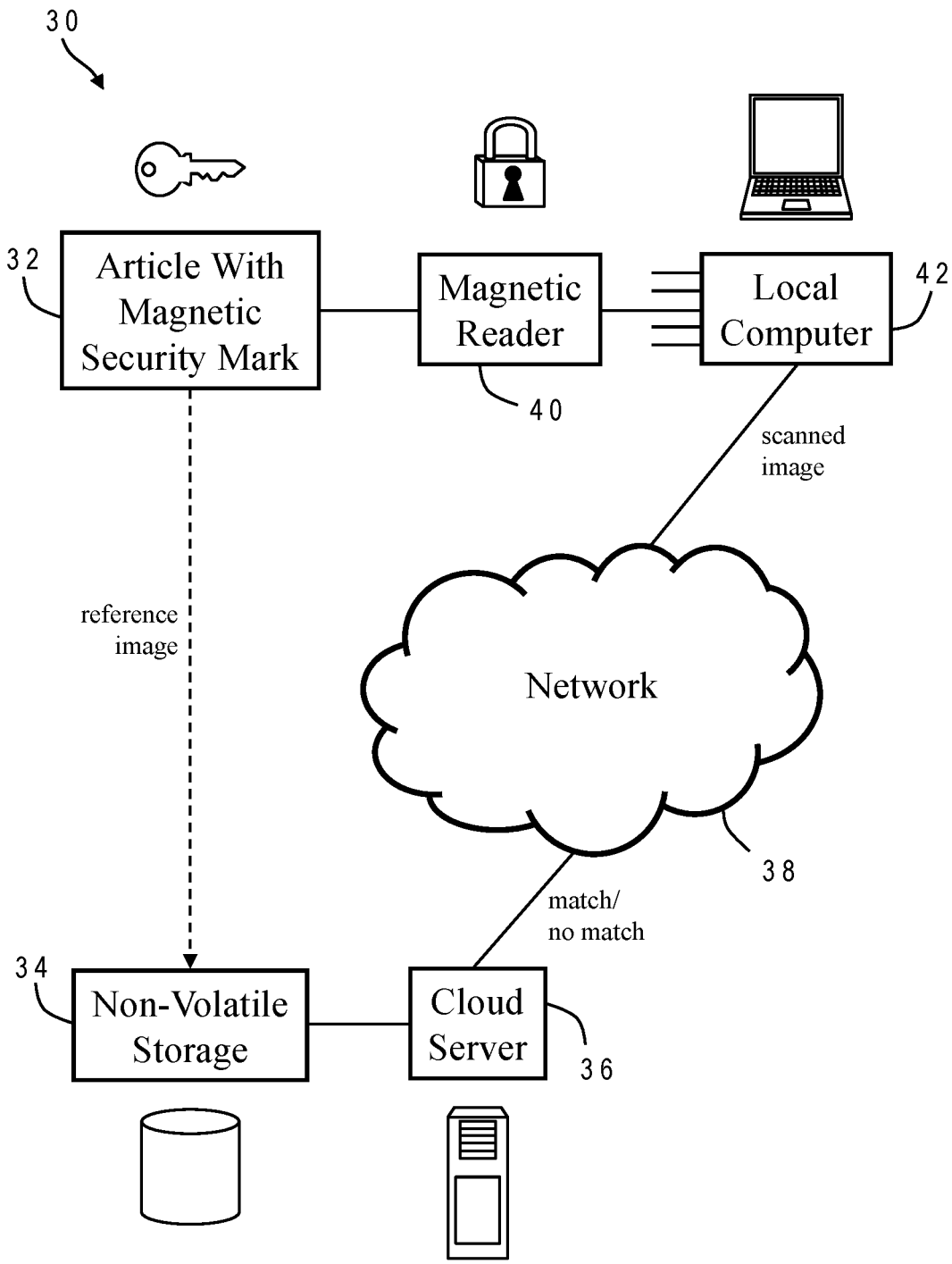
FIG. 2 is a block diagram of an authentication system for an article having a magnetic security mark in accordance with one implementation of the present invention.

With reference to FIG. 2, there is depicted a block diagram of an authentication system 30 for an article or key 32 having a magnetic security mark. The magnetic patterns are produced as described above and placed at various locations/surfaces on article 32. Pre-imaging of the magnetic patterns is performed as part of this initial preparation. The magnetic domain images may be obtained using any conventional magnetically-sensitive imaging technique such as Kerr microscopy, photoemission electron microscopy, or transmission x-ray microscopy. The patterns may be recorded prior to application to the article or after, and are associated with reference identification information, i.e., an ID number for the article. The original patterns are uploaded as reference images to a secure database in a non-volatile storage 34 accessible by a cloud server 36 along with the ID number. Cloud server 36 is further in communication with a network 38 such as the Internet. It is to be understood that although this disclosure includes a discussion of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include various characteristics, service models, and deployment models.

Characteristics of a cloud model can include, without limitation, on-demand service, broad network access, resource pooling, rapid elasticity, and measured service. On-demand self-service refers to the ability of a cloud consumer to unilaterally provision computing capabilities, such as server time and network storage, as needed automatically without requiring human interaction with the service's provider. Broad network access refers to capabilities available over a network and accessed through standard mechanisms that promote use by heterogeneous thin or thick client platforms (e.g., mobile phones, laptops, and personal digital assistants, etc.). Resource pooling occurs when the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity means that capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service is the ability of a cloud system to automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models of a cloud model can include, without limitation, software as a service, platform as a service, and infrastructure as a service. Software as a service (SaaS) refers to the capability provided to the consumer to use the provider's applications running on a cloud infrastructure. The applications are accessible from various client devices through a thin client interface such as a web browser. The consumer does not manage or control the underlying cloud infrastructure including network, servers, operating systems, storage, or even individual application capabilities, with the possible exception of limited user-specific application configuration settings. Platform as a service (PaaS) refers to the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service (IaaS) refers to the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models of a cloud model can include, without limitation, private cloud, community cloud, public cloud, and hybrid cloud. Private cloud refers to the cloud infrastructure being operated solely for an organization. It may be managed by the organization or a third party and may exist on-premises or off-premises. A community cloud has a cloud infrastructure that is shared by several organizations and supports a specific community that has shared concerns (e.g., mission, security requirements, policy, and compliance considerations). It may be managed by the organizations or a third party and may exist on-premises or off-premises. In a public cloud, the cloud infrastructure is made available to the general public or a large industry group and is owned by an organization selling cloud services. The cloud infrastructure for a hybrid cloud is a composition of two or more clouds (private, community, or public) that remain unique entities but are bound together by standardized or proprietary technology that enables data and application portability (e.g., cloud bursting for load-balancing between clouds).

Returning to FIG. 2, the owner of article 32 subjects it to a magnetic reader 40 in order to gain access to a secured object or area. In an illustrative embodiment, article 32 is a keycard and magnetic reader 40 is part of a lock which receives the keycard by inserting it into a slot. Magnetic reader 40 takes a picture of the magnetic pattern in the security mark using any of the aforementioned magnetic imaging techniques and passes that scanned image to a local computer 42. In this example, local computer 42 is used to authenticate keys from any number of locks that are part of a larger security system, each lock having its own key requirements. Local computer 42 takes the scanned image and passes it to cloud server 36 via network 38 with an authentication request. The authentication request includes verification information for the particular magnetic reader, i.e., an ID number that is associated with the lock and hence with the key that properly opens it. Cloud server 36 uses the ID number from local computer 42 as an index to retrieve the previously uploaded reference image for this magnetic reader from non-volatile storage 34, and then compares the reference image to the scanned image. If the magnetic domain images sufficiently match, cloud 36 server sends a confirmation back to local computer 42 over network 38, and local computer 42 enables the security device associated with magnetic reader 40, i.e., opens the lock. As discussed above, the magnetically-marked article may be an actual product rather than a key per se, and a system similar to authentication system 30 can be used to verify authenticity of the product.

The reference image and the scanned image may be matched by any conventional means of pattern recognition, such as comparing a finite number of features (as done with human fingerprint matching). In another embodiment they are matched using a cognitive system which has been trained with input image samples where the training images are generated using the same method used to generate the security marks. Using artificial intelligence with computer vision allows the system to determine if the entirety of the magnetic domain image is the same while reducing false positives/negatives.

Figure 3:
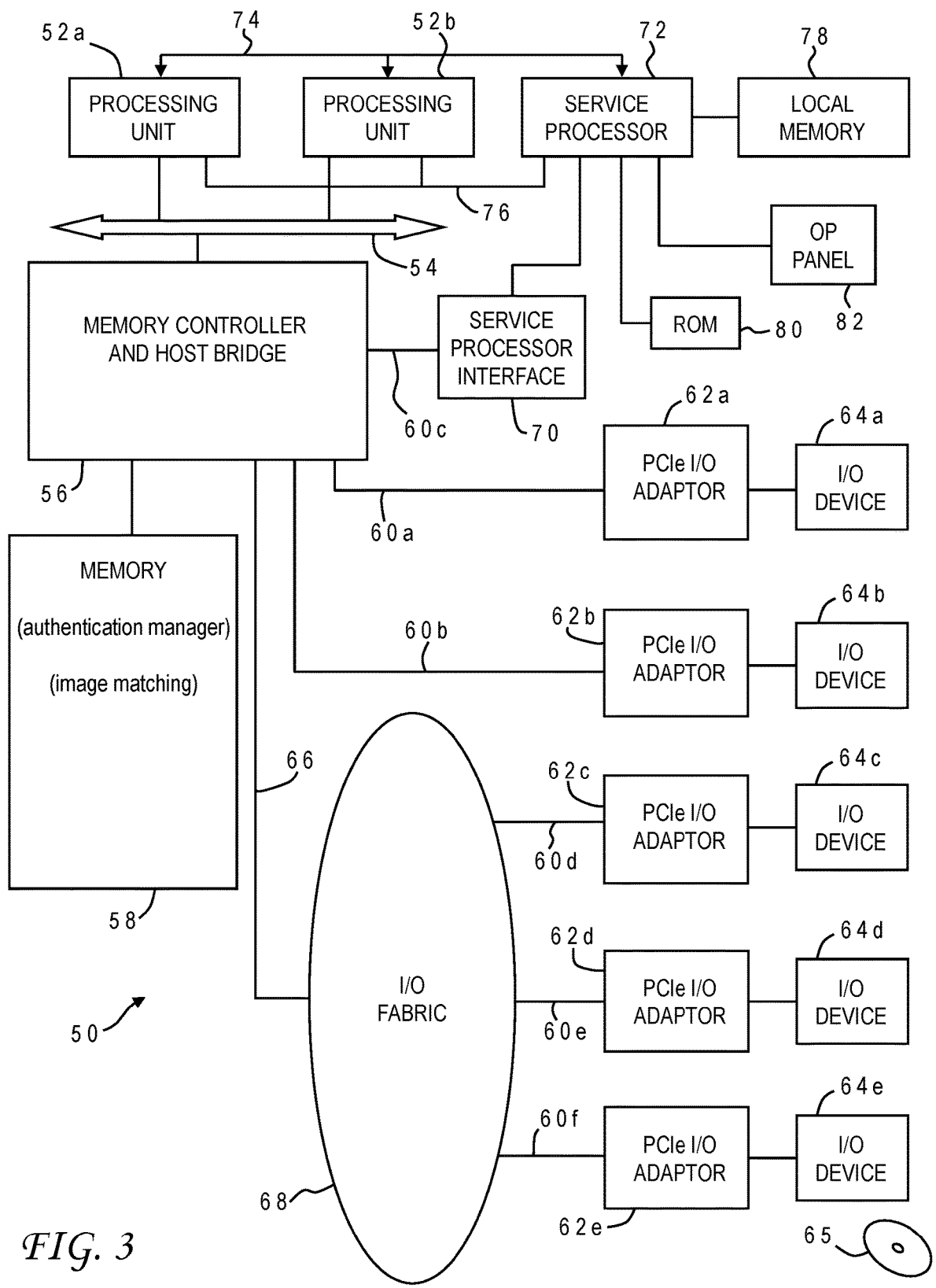
FIG. 3 is a block diagram of a computer system programmed to carry out authentication of keys or other objects having a magnetic security mark in accordance with one implementation of the present invention.

With further reference to FIG. 3, there is depicted one embodiment 50 of a computer system in which the present invention may be implemented to carry out authentication of a product or key using optically-passive magnetic signature and identification features. Computer system 50 is a symmetric multiprocessor (SMP) system having a plurality of processors 52a, 52b connected to a system bus 54. System bus 54 is further connected to and communicates with a combined memory controller/host bridge (MC/HB) 56 which provides an interface to system memory 58. System memory 58 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 58 has loaded therein one or more applications in accordance with the present invention, such as an authentication manager and an image matching module.

MC/HB 56 also has an interface to peripheral component interconnect (PCI) Express links 60a, 60b, 60c. Each PCI Express (PCIe) link 60a, 60b is connected to a respective PCIe adaptor 62a, 62b, and each PCIe adaptor 62a, 62b is connected to a respective input/output (I/O) device 64a, 64b. MC/HB 56 may additionally have an interface to an I/O bus 66 which is connected to a switch (I/O fabric) 68. Switch 68 provides a fan-out for the I/O bus to a plurality of PCI links 60d, 60e, 60f These PCI links are connected to more PCIe adaptors 62c, 62d, 62e which in turn support more I/O devices 64c, 64d, 64e. The I/O devices may include, without limitation, a keyboard, a graphical pointing device (mouse), a microphone, a display device, speakers, a permanent storage device (hard disk drive) or an array of such storage devices, an optical disk drive which receives an optical disk 65 (one example of a computer readable storage medium) such as a CD or DVD, and a network card. One of the I/O devices 64 can be the magnetic scanner used to retrieve the magnetic pattern off the article.

Each PCIe adaptor provides an interface between the PCI link and the respective I/O device. MC/HB 56 provides a low latency path through which processors 52a, 52b may access PCI devices mapped anywhere within bus memory or I/O address spaces. MC/HB 56 further provides a high bandwidth path to allow the PCI devices to access memory 58. Switch 68 may provide peer-to-peer communications between different endpoints and this data traffic does not need to be forwarded to MC/HB 56 if it does not involve cache-coherent memory transfers. Switch 68 is shown as a separate logical component but it could be integrated into MC/HB 56.

In this embodiment, PCI link 60c connects MC/HB 56 to a service processor interface 70 to allow communications between I/O device 64a and a service processor 72. Service processor 72 is connected to processors 52a, 52b via a JTAG interface 74, and uses an attention line 76 which interrupts the operation of processors 52a, 52b. Service processor 72 may have its own local memory 78, and is connected to read-only memory (ROM) 80 which stores various program instructions for system startup. Service processor 72 may also have access to a hardware operator panel 82 to provide system status and diagnostic information.

In alternative embodiments computer system 50 may include modifications of these hardware components or their interconnections, or additional components, so the depicted example should not be construed as implying any architectural limitations with respect to the present invention. The invention may further be implemented in an equivalent cloud computing network.

When computer system 50 is initially powered up, service processor 72 uses JTAG interface 74 to interrogate the system (host) processors 52a, 52b and MC/HB 16. After completing the interrogation, service processor 72 acquires an inventory and topology for computer system 50. Service processor 72 then executes various tests such as built-in-self-tests (BISTs), basic assurance tests (BATs), and memory tests on the components of computer system 50. Any error information for failures detected during the testing is reported by service processor 72 to operator panel 82. If a valid configuration of system resources is still possible after taking out any components found to be faulty during the testing then computer system 50 is allowed to proceed. Executable code is loaded into memory 58 and service processor 72 releases host processors 52a, 52b for execution of the program code, e.g., an operating system (OS) which is used to launch applications and in particular the authentication application of the present invention, results of which may be stored in a hard disk drive of the system (an I/O device 64). While host processors 52a, 52b are executing program code, service processor 72 may enter a mode of monitoring and reporting any operating parameters or errors, such as the cooling fan speed and operation, thermal sensors, power supply regulators, and recoverable and non-recoverable errors reported by any of processors 52a, 52b, memory 58, and MC/HB 56. Service processor 72 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
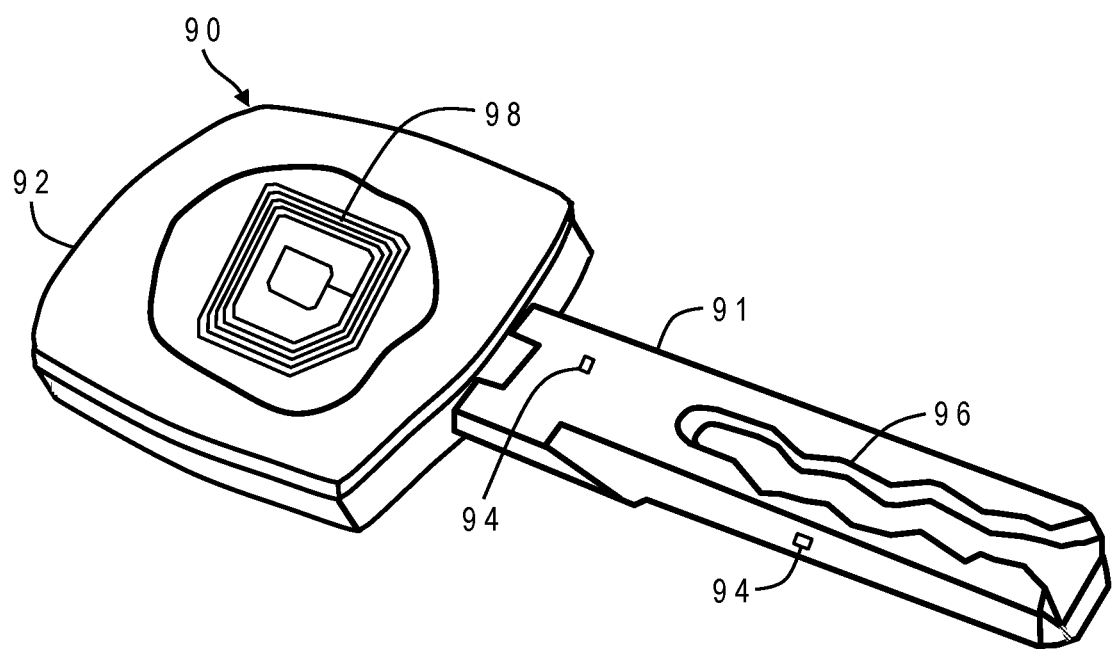
FIG. 4 is a perspective view of a key that has three different types of security features in accordance with one implementation of the present invention, including mechanical features, an electronic feature (RFID circuit), and the magnetic signature and identification feature.

As noted above, the magnetic security mark of the present invention can be combined with other security features. FIG. 4 shows one embodiment of a key 90 having a rigid blade member 91 and a handle portion 92. Key 90 has three security features including magnetic security marks 94 applied to blade member 91, mechanical features 96 formed along blade member 91 which interact with corresponding mechanical features of a lock, and a radio-frequency identification (RFID) chip 98 embedded in handle portion 92. Magnetic security marks 94 can be placed at multiple locations including different surfaces. In this embodiment there are at least four magnetic security marks 94, one on each of the four sides of blade member 91 (top, bottom, left and right). Each magnetic security mark 94 is placed at a specific known position along blade member 91, and the corresponding magnetic reader for key 90 will only scan those positions (when key 90 is fully inserted into the lock), so a misplaced mark on a counterfeit key will not register. RFID chip 98 is conventional and emits an encoded signal providing an additional level of electronic security.

Figure 5:
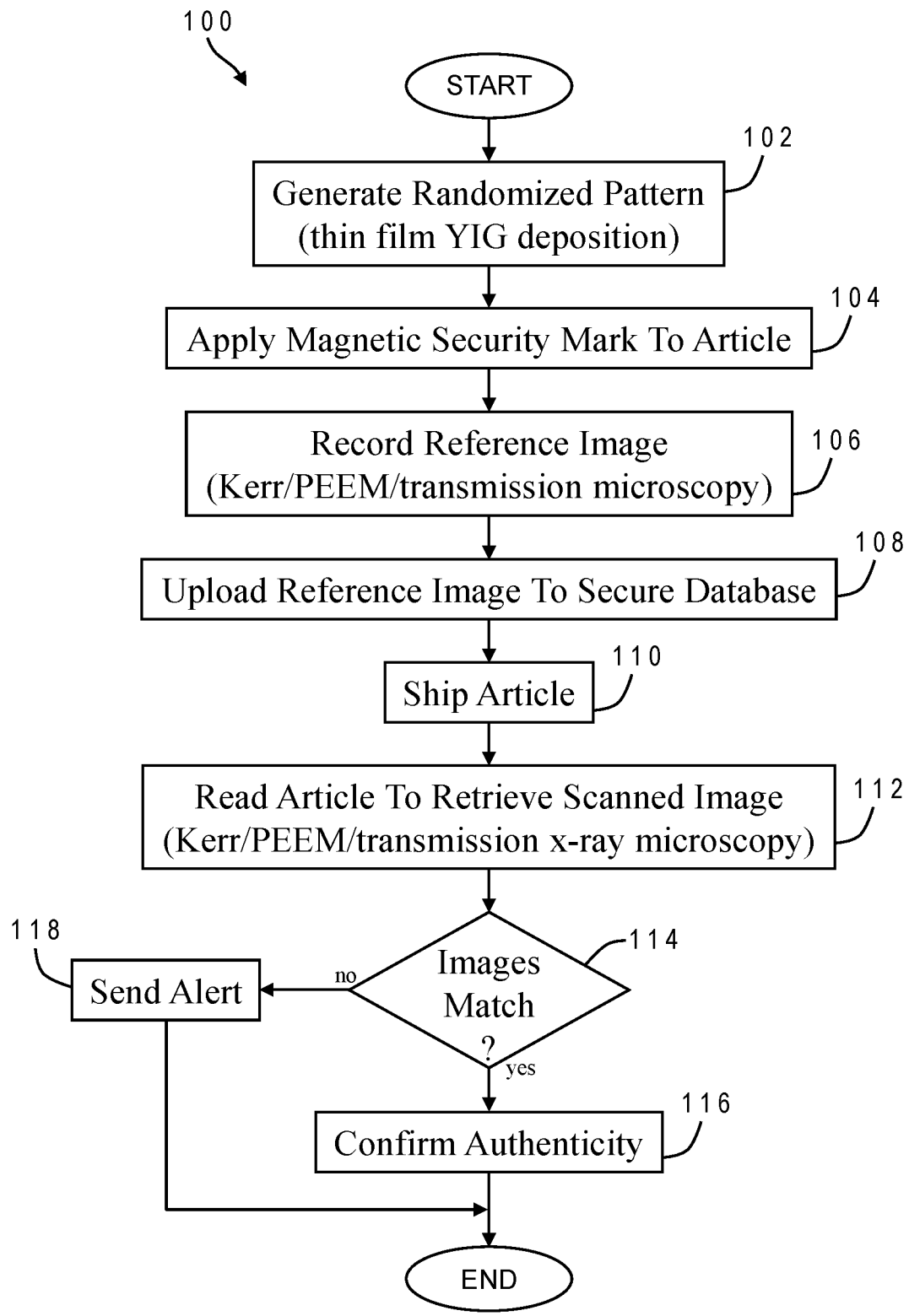
FIG. 5 is a chart illustrating the logical flow for an authentication process in accordance with one implementation of the present invention.

The present invention may be further understood with reference to the chart of FIG. 5 illustrating an authentication process 100 in accordance with one implementation of the present invention. Process 100 is intended for marking an article such as that depicted in FIG. 1, but variations of the process could also be applied to a physical key as depicted in FIG. 4. Process 100 begins by generating a randomized pattern 102 for use as a magnetic security mark. The randomized pattern can be generated using YIG thin films grown by pulsed laser deposition, resulting in a unique design. A magnetic security mark having the randomized pattern is applied to the article of interest 104, and a record is made for the reference image of the pattern 106. This reference image is uploaded to the secure database on the cloud 108. Thereafter, the article is shipped to a customer or other recipient 110. The user scans the article to retrieve a post-shipping image for the magnetic security mark 112. That scanned image is compared to the previously uploaded reference image 114. If the magnetic domain images match, the authenticity of the article is confirmed 116 and the delivery is accepted. If not, an alert is sent to the appropriate parties indicating rejection of the delivery of the article 118.

The present invention in its various embodiments thereby provides a superior approach to physical security devices. Since the creation of the magnetic patterns is random, they cannot be predicted by would-be counterfeiters. The resulting randomized nanoscale features allow the present invention to outperform current process capabilities in duplication techniques for keys. A single key or article with as few as four magnetic security marks and a 14-bit analog-to-digital conversion can still achieve over one billion unique physical pad combinations. This approach represents a multi-generational improvement in key technology, particularly when combined with an embedded encrypted RFID.

The magnetic pattern is sensitive to heat, physical shock, and magnetic fields. This characteristic provides a means to narrow down the cause of any tampering or lack of environmental control during transit. If the manufacturer requires magnetic shielding and near-room temperatures for transporting an electronic component, but the shipping company does not comply, the manufacturer can know immediately upon arrival that something is wrong. They can then void the part and investigate further. This sensitivity may be more useful to implementations where an article is marked (as in FIG. 1) as opposed to a physical key having markings (as in FIG. 4).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of authenticating an article comprising:
   receiving the article in a magnetic reader device, wherein the article comprises at least one magnetic security mark on a substrate of the article generated at least by applying a thin film deposition of magnetic material to the substrate that generates a random nanoscale optically-passive magnetic pattern defining at least one magnetic domain scanned image;
   scanning the article using a magnetically-sensitive imaging technique, executed by the magnetic reader device, to retrieve the at least one magnetic domain scanned image from the at least one magnetic security mark; and
   comparing the scanned image to a magnetic domain reference image recorded in a secure non-volatile storage, the magnetic domain reference image being uniquely associated with the article, to determine that the magnetic domain scanned image matches the magnetic domain reference image, wherein said scanning retrieves a plurality of magnetic domain scanned images from a plurality of corresponding magnetic security marks applied to a common surface of the substrate, wherein the plurality of corresponding magnetic security marks are positioned on the substrate at non-uniform locations along the substrate, each magnetic security mark in the plurality of corresponding magnetic security marks provides a different magnetic domain scanned image, and said comparing compares the magnetic domain scanned images respectively to a plurality of magnetic domain reference images recorded in the secure non-volatile storage.

2. The method of claim 1 wherein the magnetic domain reference image is associated with an identification number in the secure non-volatile storage, and said comparing is responsive to an authentication request which transmits the magnetic domain scanned image with the identification number.

3. The method of claim 1 wherein the magnetically-sensitive imaging technique is selected from the group consisting of Kerr microscopy, photoemission electron microscopy, and transmission X-ray microscopy.

4. The method of claim 1 wherein the article is a physical key having mechanical features which interact with mechanical features of a corresponding lock, and said scanning is performed by the magnetic reader device which is located in the lock.

5. The method of claim 1, wherein the magnetic reader device is part of a lock and the article is one of a physical key with mechanical features formed in physical material of a blade member of the physical key for engaging a mechanical mechanism of the lock, or a keycard.

6. The method of claim 1, wherein the article comprises at least three security features, wherein a first security feature is the at least one magnetic security mark, a second security feature is a mechanical security feature formed in the article that interfaces with corresponding mechanical features of a locking mechanism having the magnetic reader device, and a third security feature is a wireless communication device embedded in a portion of the article and which emits an encoded signal.

7. The method of claim 6, wherein access to a locked area is granted in response to all three security features being authenticated, wherein the first security feature is authenticated based on results of the comparing, the second security feature is authenticated in response to the mechanical security feature causing the mechanism features of the locking mechanism to engage properly, and the third security feature is authenticated by providing an authentic encoded signal for the article.

8. The method of claim 1, wherein the article is covered with a blanket film that prevents optical detection of the at least one magnetic security mark.

9. The method of claim 1, wherein the article comprises at least four magnetic security marks provided on different surfaces of the article, and wherein each of the four magnetic security marks generates a different magnetic domain scanned image when read by the magnetic reader device.

10. An article comprising:
    a substrate; and
    at least one magnetic security mark formed on the substrate, the magnetic security mark being a randomly-generated nanoscale optically-passive magnetic pattern defining a magnetic domain reference image which is uniquely associated with the article, wherein the at least one magnetic security mark is formed on the substrate at least by applying a thin film deposition of magnetic material to the substrate that generates the nanoscale optically-passive magnetic pattern, wherein the article is authenticated by scanning the at least on magnetic security mark to retrieve a plurality of magnetic domain scanned images from a plurality of corresponding magnetic security marks applied to a common surface of the substrate, wherein the plurality of corresponding magnetic security marks are positioned on the substrate at non-uniform locations along the substrate, each magnetic security mark in the plurality of corresponding magnetic security marks provides a different magnetic domain scanned image, and the article is further authenticated at least by comparing the magnetic domain scanned images, respectively, to a plurality of magnetic domain reference images recorded in a secure non-volatile storage.

11. The article of claim 10 wherein the randomly-generated nanoscale magnetic patterns for at least two of the at least one magnetic security mark include lines of magnetized material having different line thicknesses.

12. The article of claim 10 wherein the article is a physical key having a handle and a blade member, the substrate being part of the blade member, and further comprising mechanical features formed on the blade member which interact with mechanical features of a corresponding lock.

13. The article of claim 10, wherein the article comprises at least three security features, wherein a first security feature is the at least one magnetic security mark, a second security feature is a mechanical security feature formed in the article that interfaces with corresponding mechanical features of a locking mechanism having the magnetic reader device, and a third security feature is a wireless communication device embedded in a portion of the article and which emits an encoded signal.

14. The article of claim 13, wherein access to a locked area is granted in response to all three security features being authenticated, wherein the first security feature is authenticated based on the article being scanned by a magnetic reader device of a locking mechanisms and comparing, by the locking mechanism, a magnetic image obtained from the scanning to a previously stored magnetic image for the article, the second security feature is authenticated in response to the mechanical security feature causing the mechanism features of the locking mechanism to engage properly, and the third security feature is authenticated by providing an authentic encoded signal for the article.

15. The article of claim 10, further comprising a blanket film on the substrate that prevents optical detection of the at least one magnetic security mark.

16. The article of claim 10, wherein the at least one magnetic security mark comprises at least four magnetic security marks provided on different surfaces of the substrate, and wherein each of the four magnetic security marks generates a different magnetic domain scanned image when read by a magnetic reader device.

17. A physical key comprising:
a handle; and
a security member attached to the handle, the security member having mechanical features formed thereon which interact with mechanical features of a corresponding lock, and having at least one magnetic security mark formed thereon, the magnetic security mark being a randomly-generated nanoscale optically-passive magnetic pattern defining a magnetic domain image which is uniquely associated with the article, wherein the at least one magnetic security mark is formed on the security member at least by applying a thin film deposition of magnetic material to a substrate of the security member that generates the nanoscale optically-passive magnetic pattern, wherein the physical key is authenticated by scanning the at least on magnetic security mark to retrieve a plurality of magnetic domain scanned images from a plurality of corresponding magnetic security marks applied to a common surface of the substrate, wherein the plurality of corresponding magnetic security marks are positioned on the substrate at non-uniform locations along the substrate, each magnetic security mark in the plurality of corresponding magnetic security marks provides a different magnetic domain scanned image, and the physical key is further authenticated at least by comparing the magnetic domain scanned images, respectively, to a plurality of magnetic domain reference images recorded in a secure non-volatile storage.

18. The physical key of claim 17 wherein the security member has four sides, each side having at least one magnetic security mark, each of the magnetic security marks having different randomly-generated nanoscale magnetic patterns.

19. The physical key of claim 17, wherein:
the physical key comprises at least three security features comprising a first security feature is the at least one magnetic security mark, a second security feature is a mechanical security feature formed in the article that interfaces with corresponding mechanical features of a locking mechanism having the magnetic reader device, and a third security feature is a wireless communication device embedded in a portion of the article and which emits an encoded signal, and
access to a locked area is granted in response to all three security features being authenticated, wherein the first security feature is authenticated based on results of the comparing, the second security feature is authenticated in response to the mechanical security feature causing the mechanism features of the locking mechanism to engage properly, and the third security feature is authenticated by providing an authentic encoded signal for the article.

* * * * *